United States Patent
Pala et al.

(10) Patent No.: US 10,417,328 B2
(45) Date of Patent: Sep. 17, 2019

(54) TEXT QUALITY EVALUATION METHODS AND PROCESSES

(71) Applicant: Searchmetrics GmbH, Berlin (DE)

(72) Inventors: Ahmet Anil Pala, Berlin (DE); Alexander Kagoshima, Berlin (DE); Marcus Tober, Berlin (DE)

(73) Assignee: Searchmetrics GmbH, Berlin (DE)

( * ) Notice: Subject to any disclaimer, the term of this patent is extended or adjusted under 35 U.S.C. 154(b) by 44 days.

(21) Appl. No.: 15/863,408

(22) Filed: Jan. 5, 2018

(65) Prior Publication Data
US 2019/0213247 A1 Jul. 11, 2019

(51) Int. Cl.
*G06F 17/27* (2006.01)

(52) U.S. Cl.
CPC .................................. *G06F 17/274* (2013.01)

(58) Field of Classification Search
CPC ....... G10L 15/26; G10L 15/00; G10L 15/197; G10L 15/065; G10L 13/027; G10L 15/02; G10L 15/08; G06F 17/27; G06F 17/21; G06F 3/16; G06F 15/16; G06N 99/00
See application file for complete search history.

(56) References Cited

U.S. PATENT DOCUMENTS

| | | | | |
|---|---|---|---|---|
| 8,370,143 B1 * | 2/2013 | Coker | .................. | G06F 17/276 704/240 |
| 8,650,031 B1 * | 2/2014 | Mamou | ................... | G10L 15/08 704/235 |
| 2002/0165717 A1 * | 11/2002 | Solmer | ................ | G06F 17/2775 704/256.4 |
| 2007/0078654 A1 * | 4/2007 | Moore | ................. | G06F 17/2827 704/252 |
| 2007/0299664 A1 * | 12/2007 | Peters | .................. | G06F 17/2282 704/235 |
| 2009/0012789 A1 * | 1/2009 | Gaudet | ................. | G06F 17/273 704/251 |
| 2009/0299731 A1 * | 12/2009 | Owen | .................. | G06F 16/3343 704/9 |
| 2010/0114571 A1 * | 5/2010 | Nagatomo | ............ | G06F 16/433 704/235 |
| 2011/0161072 A1 * | 6/2011 | Terao | ....................... | G06F 17/28 704/9 |
| 2012/0197770 A1 * | 8/2012 | Raheja | ................. | G06F 17/2258 705/30 |
| 2013/0297290 A1 * | 11/2013 | Bostick | .................... | G10L 15/01 704/9 |
| 2013/0304469 A1 * | 11/2013 | Kamada | ................... | G10L 15/02 704/239 |
| 2014/0142954 A1 * | 5/2014 | Cameron | ......... | G11B 20/10527 704/276 |
| 2015/0066502 A1 * | 3/2015 | Achituv | .................. | G10L 15/07 704/235 |

(Continued)

*Primary Examiner* — Mohammad K Islam

(74) *Attorney, Agent, or Firm* — Millen, White, Zelano & Branigan, P.C.; William Nixon

(57) ABSTRACT

Methods and processes evaluate a quality score of a text. The text includes a plurality of words. The methods compute first probability characteristics of groups of words in a reference text which is known to be a high-quality text. The methods also compute second probability characteristics of groups of words in a text to be scored. The methods also compute the quality score based on a difference between the first probability characteristics and the second probability characteristics.

20 Claims, 4 Drawing Sheets

(56) References Cited

U.S. PATENT DOCUMENTS

| | | | |
|---|---|---|---|
| 2015/0242387 A1* | 8/2015 | Rachevsky | G10L 15/06 704/9 |
| 2015/0269932 A1* | 9/2015 | Evanini | G10L 15/1822 704/235 |
| 2016/0019471 A1* | 1/2016 | Shin | G06F 9/4881 706/12 |
| 2016/0140108 A1* | 5/2016 | Lee | G06F 17/2765 715/728 |
| 2016/0189704 A1* | 6/2016 | Suzuki | G10L 13/10 704/260 |
| 2016/0300573 A1* | 10/2016 | Carbune | G10L 15/193 |
| 2018/0082680 A1* | 3/2018 | Pereg | G10L 15/02 |
| 2018/0203848 A1* | 7/2018 | Perez | G10L 25/30 |
| 2018/0349327 A1* | 12/2018 | Yang | G06F 17/273 |
| 2019/0043504 A1* | 2/2019 | Li | G10L 15/26 |

\* cited by examiner

Fig. 3

TEXT QUALITY EVALUATION METHODS AND PROCESSES

FIELD OF THE INVENTION

The present invention generally relates to a method for evaluating the quality of a text.

DISCUSSION OF THE RELATED ART

In several fields such as online marketing, newspapers, online stores, and more generally any field in which the financial success of a service provider depends on the quality of the content which is provided to the users, it is highly important to ensure that the content has a high quality.

For instance, with reference to online marketing and online stores, it is often the case that the amount of traffic generated by the respective websites and the amount of conversions, or sales, resulting for the articles or services which are marketed or offered for sale, depends on the quality of the content used to describe such articles or services. In other words, a customer looking for an item, for instance a new mobile phone, is more likely to buy the item on a given website, if the website provides a better description of such item. A similar argument applies to newspapers, which are bound to attract more customers if their content is deemed to have a higher quality than other newspapers.

Several kinds of websites need to be constantly updated in order to attract clients or visitors. This is the case, for instance, of news websites, which regularly need to create new content to make sure customers regularly browse the website, thereby creating revenues, for instance through paid advertisement space. It could also be the case, for instance, of retail websites, which regularly need to update the items on offer.

The person in charge of creating or updating the content of a website is generally referred to as content creator. The activity of the content creator consists in creating and or updating content, in particular text, with the purpose of attracting traffic to the website. A number of software tools have been developed for assisting the content creator in this activity. Nevertheless, the activity still mainly relies on the capability, expertise and hard work of the content creator.

If the content generated by the content creator has a low quality, the traffic and/or the conversions generated by the content decreases. It is therefore important for the employee, or the customer, of the content creator to ensure that the content has a high quality.

As of today this check is carried out by hand. The person in charge of checking quality selects a few random contents created by the content creator and evaluates the quality of the content.

This approach has several disadvantages.

By only analyzing a few contents it may be difficult to reach conclusions on the entire work carried out by the content creator. This statistical approach requires the person in charge of quality to evaluate a large number of contents, thus increasing the costs associated with such quality checking.

Moreover this analysis is highly dependent on how each single person in charge of quality subjectively evaluates the content. It is extremely difficult for the person in charge of quality to objectively evaluate different contents from different creators in the same manner. This renders such subjective quality evaluation to be less of value to the employer of the customer of the content creator.

The present invention has been developed to solve one or more of the above-described problems.

In particular it is one object of the invention to provide an automated and objective manner for evaluating the quality of a text.

SUMMARY OF THE INVENTION

Some embodiments of the present invention generally rely on the idea that high quality content, or high quality text, is informative, concise and therefore not redundant. Readers tend to be annoyed and lose attention when reading a text with a high repetition of the same words. The invention exploits this by analyzing characteristics of the text under evaluation with respect to characteristics extracted from reference texts, so as to score the quality of the text under evaluation with respect to the reference text.

More specifically, an embodiment the invention analyzes the characteristics of groups of words in a reference text and compares the characteristics of groups of words from a text to be scored to the characteristics of the groups of words of the reference text, in order to compute the quality score.

In further embodiments, the comparison is achieved by means of a transformation matrix based on the characteristics from the reference text. In particular, the transformation matrix is trained on the characteristics from the reference text, such that the application and the subsequent inverse application of the transformation matrix return a set of re-created characteristics which is close to the original characteristics. When the same process is applied to a text to be scored, since the transformation matrix was trained on a high-quality text, the more the re-created characteristics differ from the original characteristics, the lower the quality score is.

In particular, an embodiment of the invention can relate to a method for evaluating a quality score of a text, the text comprising a plurality of words, the method comprising the steps of: computing first probability characteristics of groups of words in a reference text which is known to be a high-quality text, computing second probability characteristics of groups of words in a text to be scored, computing the quality score based on a difference between the first probability characteristics and the second probability characteristics.

Thanks to this approach it is advantageously possible to compute a quality score by evaluating mathematical characteristics of the text to be scored and comparing them to mathematical characteristics of the reference text. This allows the method to operate with any language and, by operating on probabilities instead of absolute values, to operate independently of possible different sizes among the reference text and the text to be scored.

In some advantageous embodiments, the groups of words can have a length comprised between 2 and 6, preferably between 2 and 4, even more preferably equal to 2.

Thanks to this approach it is advantageously possible to extract characteristics from the texts which have been proven to provide a good characterization of the text, while containing the computing resources needed for carrying out the method.

In some advantageous embodiments, the step of computing the first probability characteristics and/or the step of computing the second probability characteristics can comprise identifying unique groups of words and computing a group weight for each unique group of words.

Thanks to this approach it is advantageously possible to evaluate how often a given unique group appears within the text. This indication characterizes a text in terms of quality, as unique groups tend to appear in similar manners in similar quality texts.

In some advantageous embodiments, the group weight can be based on a number of times the unique group appears in the reference text and/or the text to be scored.

Thanks to this approach it is advantageously possible to easily compute the group weight by simply counting the number of times that the unique group appears within the text under consideration.

In some advantageous embodiments, the group weight can be based on the length of sentences in which the unique group appears in the reference text and/or the text to be scored.

Thanks to this approach it is advantageously possible to even more precisely characterize the text under consideration.

In some advantageous embodiments, the group weight can be defined as $$GW_j = \Sigma_{i(\text{for all } Si \text{ comprising } Gj)} F(L_i)$$

where: GWj is the group weigth for the j-th group, $G_j$ is the j-th group, $L_i$ is a length of a sentence, $S_i$ is one of the sentences from the reference text (2000), and the function F is a monotonically increasing function.

Thanks to this approach it is advantageously possible to compute a group weight which is taking into account the length of the sentence in which the unique group appears while also compensating, via the monotonically increasing function, for the effect of different sentence lengths.

In some advantageous embodiments, the step of computing the first probability characteristics and/or the step of computing the second probability characteristics can comprise associating to each unique group the respective group weight and a probability of the unique group to appear in a large text corpus.

Thanks to this approach it is advantageously possible to order the unique groups based on their probability to appear in a given language, thanks to the usage of a large text corpus representative of that language, and to evaluate their appearance characteristics in the given text based on the group weight.

In some advantageous embodiments, the large text corpus can have a size larger than 1 million sentences, more preferably larger than 10 million sentences, even more preferably larger than 50 million sentences.

Thanks to this approach it is advantageously possible to consider the large text corpus to provide a reliable indication of the average probability of a large number of unique groups to be used in a given language.

In some advantageous embodiments, the step of computing the first probability characteristics and/or the step of computing the second probability characteristics can comprise grouping the unique groups in a plurality of probability intervals based on the probability associated to the unique groups, and combining the group weights within each probability interval.

Thanks to this approach it is advantageously possible to order the information describing how often the respective groups appear in the text based on their probability value to appear in the given language.

In some advantageous embodiments, a number of the probability intervals can be comprised between 3 and 50, preferably between 3 and 20.

Thanks to this approach it is advantageously possible to compact the information describing how often the respective groups appear in the text within a data of manageable size for further processing.

In some advantageous embodiments, the step of computing the quality score can comprise creating a transformation matrix based on the first probability characteristics, wherein the transformation matrix is a matrix which, when applied to transform the first probability characteristics into transformed first probability characteristics and to transform the transformed first probability characteristics into reconstructed first probability characteristics, minimizes a difference between the first probability characteristics and the reconstructed first probability characteristics.

Thanks to this approach it is advantageously possible to provide a transformation matrix which, when applied to texts having characteristics similar to the reference high quality text will result in a small difference between the original probability characteristics and the reconstructed probability characteristics.

In some advantageous embodiments, the step of computing the quality score can comprise applying the transformation matrix to the second probability characteristics to transform the second probability characteristics into transformed second probability characteristics and to transform the transformed second probability characteristics into reconstructed second probability characteristics, and computing the quality score based on a difference between the second probability characteristics and the reconstructed second probability characteristics.

Thanks to this approach it is advantageously possible to easily compute the quality score for any text, independently of its size, and provide a reliable indication of the quality of the text to be scored in comparison to the reference text.

In general some embodiments of the present invention can therefore be considered to evaluate how often word groups are present in a reference text and how often they are present in a text to be scored. As the word groups are likely to be different among the two texts, the invention makes advantageous uses of the probability of the word groups, such that even if a first word group in the first text and a second word group in the second text do not match each other, but their probability to appear in a given language is similar, their frequency in similar-quality texts is expected to be similar.

In fact, the inventors have found that the frequency of use of different groups having different probability values in a given language provides a sort of signature of the quality of a text. That is, if a high quality text has a first value of appearance of low probability groups and a second value of appearance of high probability group, a similar quality text will be likely to have similar appearance values for groups within the respectively corresponding probability ranges, even if the specific groups within each probability range differ from one text to the other.

Further, in the invention, instead of comparing a vast number of groups organized by probability, the use of a transformation matrix trained on the data from the reference high quality text allows the quality score evaluation to be performed in a compact yet reliable manner.

Some further embodiments of the present invention generally rely on the principle that high quality content, or high quality text, is informative, concise and therefore not redundant. Readers tend to be annoyed and lose attention when reading a text with a high repetition of the same words.

Thus the inventors have devised several approaches which allow the repetition to be evaluated and condensed in a single value which provides an indication of the quality of the text. Advantageously, the method of the invention provides a quality score which is independent of the length of the text under consideration and allows objective evaluation of text written from different content creators.

In particular, an embodiment of the invention may in particular relate to a method for evaluating a quality value of a text, the text comprising a plurality of words, the method comprising the steps of: grouping the plurality of words into a plurality of arrays of groups of words, wherein all groups comprise a predetermined number of words, wherein the predetermined number of words is the same for all groups of a given array, and wherein the predetermined number of words is different for different arrays, computing a repetition value for each array based on a number of repeated groups within each array, computing the quality value based on the repetition values.

Thanks to this approach it is possible to evaluate the repetition values for groups of different sizes, for instance groups of 2 words, 3 words, 4 words, etc. This provides an improved evaluation of the repeated content within the text compared to only evaluating a single group size.

In some embodiments, the predetermined number of words can be comprised between 2 and 20, preferably between 2 and 15, even more preferably between 2 and 10.

Thanks to this approach it is advantageously possible to evaluate the repeated content at length which are important for practical applications and at which a repetition causes a lowered perceived quality of the text. Moreover, by limiting the size of the group, it is possible to obtain a good quality value indication with limited computational resources.

In some embodiments, the step of computing the repetition value can comprise the steps of: counting a number of times each unique group is repeated within a single array, and computing a repeated content ratio according to the equation $$R\_k = [\Sigma_{n\_j > 1}(n\_j)] / [\Sigma_j(n\_j)]$$

wherein:
n_j denotes the number of times a j_th unique group is repeated in the single array, and
k is the predetermined number of words.

Thanks to this approach it is advantageously possible to simply and effectively compute the repeated content ratio.

In some embodiments, the step of computing the quality value can comprise a global dampening step configured to reduce the repeated content ratio for smaller values of repeated content ratio more than for higher values of repeated content ratio.

Thanks to this approach it is advantageously possible to distinguish heavily repeated text from slightly repeated text. In particular, by dampening more the content with a lower repeated content ratio, the effect of the higher repeated content ratio is rendered more noticeable.

In some embodiments, the global dampening step can comprise the operation:

$$Rd\_k = R\_k^{\text{insensitivity}}$$

wherein:
Rd_k is a dampened repeated content ratio for a given value of k,
insensitivity has a value which can be selected to any value higher than 1.

Thanks to this approach it is advantageously possible to simply and effectively compute a dampened repeated content ratio.

In some embodiments, insensitivity has a value comprised between 1 and 5, preferably between 1 and 3, even more preferably between 1.5 and 2.5.

Thanks to this approach it is advantageously possible to effectively dampen the effect of the smaller values of the repeated content ratio with limited computational resources.

In some embodiments, the step of computing the quality value can comprise a local dampening step which is configured to reduce the repeated content ratio for arrays having a smaller predetermined number of words more than for arrays having a larger predetermined number of words.

Thanks to this approach it is advantageously possible to give more importance in the quality score to longer repeated content. This is advantageous since longer repeated content tend to have a more negative effect on the perceived quality of the content.

In some embodiments, the local dampening step can comprise the operation:

$$R\text{std}\_k = R\_k^{((\min(k)/k)^{\text{EXP}})}$$

wherein:
min(k) is a minimum value of k used by the method, and
EXP is chosen to be higher than 0.

Thanks to this approach it is advantageously possible to simply and effectively implement the local dampening step.

In some embodiments, the step of computing the quality value can comprise an averaging step configured to average the repetition values, or values computed based on the repetition values, to provide a single output as indicative of the quality value.

Thanks to this approach it is advantageously possible to simply and effectively provide a single output indicative of the quality value even though the analysis is based on different arrays.

BRIEF DESCRIPTION OF THE FIGURES

FIG. 3 schematically illustrates an exemplary transformation matrix according to an embodiment;

DETAILED DESCRIPTION OF PREFERRED EMBODIMENTS

Although the invention can find application in different technical fields, in the following description embodiments will be explained, for ease of understanding through examples, with reference to a specific application related to the field of content, or text, for online marketing. It will however be understood that the invention is not limited to this specific application.

Figure 1:
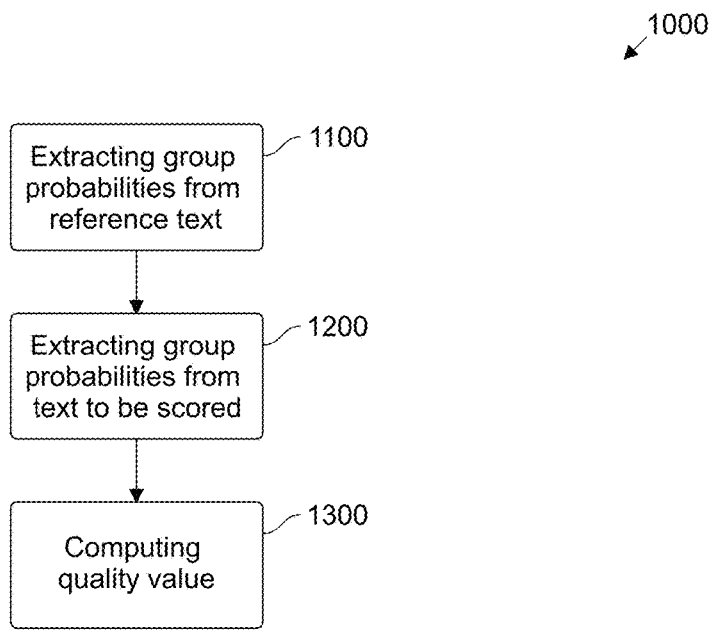
FIG. 1 schematically illustrates a method 1000 for evaluating a quality value of a text according to an embodiment.

FIG. 1 schematically illustrates a method 1000 for evaluating a quality value of a text according to an embodiment of the invention. The method will be better understood in conjunction with FIG. 2 which schematically illustrates data structures used by the method 1000 in an exemplary embodiment.

The method 1000 uses a reference text 2000 comprising words 2001-2005, which is known to be well-written text. The quality score is, in general, a comparison between probability characteristics of a text that is to be scored and the probability characteristics extracted from the reference text 2000, as will be described in the following. In one possible implementation, the reference text 2000 can be parts, or the complete version, of Wikipedia, for a given language, or one or more books, or Common Crawl, or any other corpus that consists of human-written high quality text. The size of the reference text 2000 is not a fixed value and the inventors have found that, above a certain size, the probability characteristics of high-quality texts do not change significantly. It is therefore possible to implement the invention by first carrying it out on a short-length reference text, such as 1000 words, and then increase the size of the reference text until it is noticed that the extracted probability characteristics do not vary significantly when further increasing the size of the reference text. In this manner, the computational power is contained while allowing the invention to be operated with different languages having different behaviors.

In general, from the reference text 2000, probability characteristics are extracted so as to identify patterns which allow distinguishing higher quality text from lower quality text. In the machine learning field, such characteristics are generally referred to as features. One feature which can be used in the present embodiment is the so-called group probability appearance rate. This is the rate at which a group, having a certain probability in a given language, appears in a text. These probability characteristics are first extracted from the reference text 2000 in a group probability extraction step 1100. These probability characteristics can then be used to score any new text, by comparing how the probability characteristics of the text to be scored are similar to the previously extracted probability characteristics.

In the following formal definition of a text, word groups, group weights and probabilities will be formally defined to allow a better understanding of the invention. It will be clear, however, that formally different definitions can be implemented while achieving the same scope. Thus, the invention should not be construed as being limited to the specific formal definition which is used in the following description.

Figure 2:
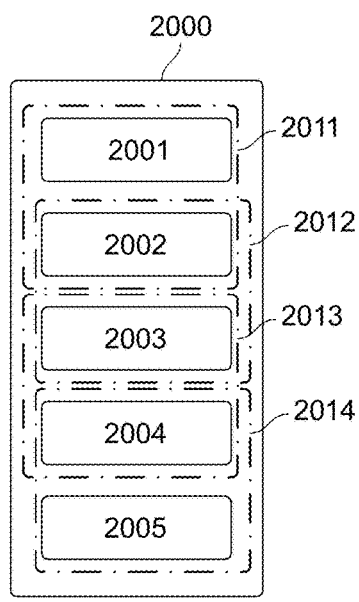
FIG. 2 schematically illustrates data structures used by the method 1000 in an exemplary embodiment.

In general, any text T can be viewed as an ordered collection of sentences as follow:

$$T=[S_1, S_2, \ldots, S_i]$$ (Eq. 1)

where each sentence S can be defined as an ordered list of words W, 2001-2005 in FIG. 2, preferably after removing the punctuation and/or stop words:

$$S_i=[W_1, W_2, \ldots, W_{ji}]$$ (Eq. 2)

where j is the number of words W in the i-th sentence $S_i$ of the text T.

In some embodiments, the invention can comprise an optional preprocessing step. The preprocessing step can insert predetermined words, or tags, to the beginning and to the end of the sentence. For instance, ⟨sbegin⟩ can be used for indicating the start of the sentence, while ⟨send⟩ can be used for indicating the end of the sentence. The end of a sentence can be recognized by the presence of a full stop "." or, in some embodiments, natural language processing algorithms can be used to recognize the sentences, for instance based on the presence of a verb and the respective subject and object. Several such algorithms are known and will not be discussed in details. Moreover, in some embodiments, the preprocessing step can insert a generic word or tag, such as ⟨number⟩, for representing any kind of number. As an example, a sentence S "I will meet her at 20 o'clock." can be represented as: [⟨sbegin⟩, i, will, meet, her, at, number⟩, o'clock, ⟨send⟩].

Moreover, the preprocessing step may clean the input text for the subsequent processing. For example, if a text has a bullet point list, there might not be any full stop at the end of a list item. By recognizing the bullet points as sentences, this problem can be overcome. Additionally, full dots such as " . . . " or " . . . . . . . . " can be converted into a single dot ".". Still further, characters that are not alphanumeric, any accented version of alphanumerics, full stop "." or comma "," can be replaced with a single space character.

Various other kinds of pre-processing can be implemented, as will be clear to the skilled person, in order to provide an input text which is suited for natural language processing. In general it will be clear that the purpose of the pre-processing step is to provide a text T for the subsequent evaluation which is cleaned from words which do not provide significant information or content.

Turning back to the description of the method 1000, once the sentences S are represented as ordered word lists, groups G 2011-2014 can be defined as consecutive sequence of words 2001-2005. Formally, groups G for the i-th sentence $S_i$ and having a size equal to n can be defined as $$G_{in}=[(W_1, \ldots, W_n), (W_2, \ldots, W_{n+1}), \ldots, (W_j, \ldots, W_{j+n-1})]$$ (Eq. 3)

It will be noted that the invention can operate with any value of n. In some particularly advantageous embodiments, a value of n can be selected from 2 to 6, preferably from 2 to 4, even more preferably equal to 2. The inventors have carried out several experiments and come to the conclusion that those values provide a good indication of the characteristics of a text while limiting the computational resources needed for implementing the invention. In the embodiment illustrated in FIG. 2, groups 2011-2014 are illustrated, as an example, as having a size n equal to 2.

For instance, when the value of words W 2001-2005 per group G 2011-2014 is selected to be equal to 2, the groups $G_{i2}$ for the i-th sentence can be defined as:

$$G_{i2}=[(W_1, W_2), (W_2, W_3) \ldots, (W_{j-1}, W_j)]$$ (Eq. 4)

which can also be expressed as $$G_{i2}=[(G_1), (G_2), \ldots, (G_{j-1})]$$ (Eq. 5)

In some embodiments it is advantageous to factor in the length of the sentence S from which the groups G are derived from, since longer sentences can advantageously have a stronger impact on the quality score, while shorter sentences can advantageously have a weaker impact on the quality score. Therefore, it is possible to represent a group G not only with its probability but also with the length of the sentence it is from. Here, a sentence S can be defined as a collection of groups G and lengths L as in the following:

$$S_i=[(G_1, L_i), (G_2, L_i), \ldots, (G_{ji-1}, L_i)]$$ (Eq. 6)

where $L_i$ is equal to ji and it represents the length, that is, the number of words W, in the i_th sentence $S_i$ of the text T. As any text T is composed of a plurality of sentences S, the text T it can then be defined as:

$$T=\{[(G_1,L_1),(G_2,L_1), \ldots ,(G_{(j1-1},L_1)],[(G_1,L_2),(G_2,L_2), \ldots ,(G_{(j2-1},L_2)],[ \ldots ],[(G_1,L_i),(G_2,L_i), \ldots ,(G_{(j1-1},L_i)]\}$$ (Eq. 7)

This list can be flattened and the unique groups can then be counted, so as to calculate a group weight GW as follows. Here, by flattening, it is meant to bring the nested items in the list to a single level. For example, when starting from $$T=([(G_A,L_1),(G_B,L_1)],[(G_A,L_2),(G_B,L_2)])$$

which comprises two items, each comprised between "[" and "]", the flattened equivalent would be $$T\_flattened=([(G_A,L_1),(G_B,L_1),(G_A,L_2),(G_C,L_2)])$$

Once the list is flattened it is possible to combine all equivalent groups and associate them to all their lengths combined. For example, if the flattened list comprises only groups G1 and G2, as in T_flattened above, the final groups would be:

$G_A$ having lengths$[L_1,L_2]$ $G_B$ having lengths$[L_1]$ $G_C$ having lengths$[L_2]$ Here it should be noted that, for ease of representation, in Eq. 7 each sentence is illustrated as having groups $G_1$, $G_2$, etc. This does not mean that group $G_1$ is the same in each sentence, that is, the counter "1" only indicates its position within the sentence, not its content. To highlight this difference, in the example above, the references A, B and C have been used to identify the same unique groups $G_A$, $G_B$ and $G_C$ within the list.

For a given unique group $G_j$, the group weight $GW_j$ can be defined based on number of times the group $G_j$ appears and/or based on the lengths $L_i$ of the sentences in which the group $G_j$ appears. In addition, in some embodiments, the lengths $L_i$ can be processed by a length smoother function F, as following $$GW_j=\Sigma_{i(for\ all\ Si\ comprising\ Gj)}F(L_i)$$ (Eq. 8)

Here the function F is a length smoother. In particular, F can be any monotonically increasing function. In a specific implementation, the function F can be defined as $$F(L_i)=(\log_{base} \min(L_i-\text{diff}))^{exp}$$ (Eq. 9)

In some embodiments, the sets of lengths $L_i$ on which the min( ) operator is performed can be the length $L_i$ currently being processed or, in some other embodiments, it could be the smallest length $L_i$ to be found in the text T. Moreover, the parameter "base" is preferably comprised between 2 and 20, more preferably between 5 and 15, and/or the parameter "exp" is preferably comprised between 1 and 5, more preferably between 1 and 3, and/or the parameter "diff" is preferably comprised between 1 and 2, more preferably between 1 and 1.5, even more preferably between 1 and 1.2 as those values have been found by the inventors to provide a reliable approach in identifying low quality texts.

Since any text T can be represented as a collection of groups G, it is possible, for any group existing in a given language, to calculate a value N(G) as the number N of sentences S in which the given group G appears in.

Based on that it is possible to compute the probability P for a given group G 2011-2014 to appear in a given language. To obtain a reliable value for an entire language it is preferable to use a corpus large enough to represent a reliable approximation of the average human language usage in the given language. For instance Wikipedia can be used to implement the corpus for the computation of P. Alternatively, a collection of random text from Internet can be used. Preferably the corpus has a size larger than 1 million sentences, more preferably larger than 10 million, even more preferably larger than 50 million.

In the following, the group probability P will be defined as follows:

$$P(G_k)=(N(G_k))/(\text{total number of sentences } S \text{ in the corpus})$$ (Eq. 10)

Once the group probabilities P are extracted, preferably for all possible groups G, it is possible to extract the characteristics of their occurrence in the reference text 2000. In particular, the description above illustrates how, for a given group G, the group weight WG can be computed. In the invention, the group weight WG extracted from the text under consideration is associated to the probability value of the unique group, extracted from the large corpus representative of the language, as described above.

In particular, when the quality score is to be computed for a new text T1 different from the reference text T, the groups G present in text T1 are again identified, their group weights is again calculated and they are associated with the respective probability values derived from the large corpus.

That is, for any given unique group $G_A$, it is checked what the probability value of the group $G_A$ is, from the analysis carried out in the large representative corpus, and this probability value is associated to the group $G_A$. This association of the probability value to the respective unique group is carried out for each unique group of the reference text and each unique group of the text to be scored. This is a computationally intensive operation.

To approach this computationally intensive operation, in some embodiments, instead of maintaining all probabilities P and the corresponding groups G in the memory of a computer, which would require a large amount of memory, the list of probabilities P and the associated groups G can be stored in a relational database. This reduces the amount of memory needed, since the data can be stored on a hard-disk instead of memory.

In some further advantageous embodiments, a text store can be implemented, providing an inverted index for quick lookup. As an example, Elasticsearch, an open source inverted index database, can be used. However, the invention is not limited thereto. As an exemplary operation of an inverted index, as an example, the following two texts, each of which consists of one sentence only, can be considered:

Example1: D1="tomorrow I will not be in the office"
Example2: D2="who will be working tomorrow?"

In this case the inverted index could be stored in a data structure that looks like the following:

tomorrow→D1, D2
I→D1
will→D1, D2
not→D1
be→D1, D2
working→D2
who→D2
in→D1
the→D1
office→D1 above only groups having length equal to 1 are indexed, while in some embodiments also groups with different sizes could be indexed. In some embodiments this depends on the kind of groups for which probabilities are calculate for. Once the index is computed, it is possible to retrieve from the index how many documents have a certain group in it. The inverted index technology therefore allows for a very quick lookup of groups and the calculation of their probability. It advantageously does not require large amounts of memory since the inverted index stores the data in a highly compressed way. This technology therefore allows a quick look up of the probability value P for a given group G, with contained computation resources. It will be clear however that, in alternative embodiments, other manners of retrieving the probability P, for a given group G, from the previously stored probabilities P of groups G from the large corpus, can be implemented.

Going back to the characterization of the text T, for a given text T, as described above, it is possible to compute the group weights WG and retrieve the probabilities P associated to the groups G, thereby represent the text T as follows:

$$T=[(WG_1,P_1),(WG_2,P_2), \ldots ,(WG_R,P_R)] \quad \text{(Eq. 11)}$$

where "R" is the number of unique groups G in the text T. That is, groups $G_A$, $G_B$, $G_C$, etc. such that each unique group, for instance $G_A$, is different from all other unique groups $G_B$, $G_C$ in the text T.

At this point, the probabilities P, together with the respective groups G and/or group weights WG, can be distributed into a plurality of probability intervals. That is, given a probability interval between values A and B, all groups G having a probability value P comprised between A and B are associated to that interval. The probability intervals effectively divide the entire probability range, from 0 to 1, into a number of sub-ranges, or intervals. The number of intervals can be comprised between 3 and 50, preferably between 3 and 20, as the inventors have identified those values in being an ideal tradeoff between the number of features represented and the computational resources required.

Each probability interval so defined generally represents a feature, or probability characteristic, for the text T being analyzed. For example the first probability interval which is for the groups G with probabilities P range from 0 to P1, preferably a low value such as $10^{-9}$, indicates the groups having very-low probability of occurring in a corpus of well-written text.

In some embodiments, the intervals can be evenly-spaced in a logarithmic scale. The inventors have in fact run several experiments and identified this characteristic as advantageously being particularly reliable in providing a meaningful quality score.

In some further embodiments, the intervals can be defined as follows:

$$\text{interval list 1} := \forall i \in (1,2, \ldots ,\text{card}(B)),[10^{\wedge}(B_{(i-1)}),10^{\wedge}(B_i)) \quad \text{(Eq. 12)}$$

where $B := (-9, -8.5, -8.0, \ldots , -0.5, 0.0)$

In some further embodiments, a low-probability range can be added to the interval list as defined above so as to define a second interval list as $$\text{interval list 2} := [0,10^{\wedge}(-9))+\text{interval list 1} \quad \text{(Eq. 13)}$$

Independently on how the intervals are selected, the probability range, from 0 to 1 in the examples above, can be divided in a plurality of intervals. For each interval, the groups weights WG whose probabilities fall within the interval can be added, so as to result in a single interval group weight IGW associate to the interval.

$$C=[IWG_1,IWG_2, \ldots IWG_{MAX}]^T \quad \text{(Eq. 14)}$$

where MAX is the maximum number of intervals in which the entire probability range has been divided, as described above, while T indicate a transposition operation. In some embodiments, it is further possible to normalize the value of C, for instance by using the $L_1$ value.

Based on the above steps is therefore possible to extract a vector C for any text. This vector indicates probability characteristics of the text and allows different texts to be compared to each other. As the reference text 2000 is known to be a higher-quality human-written text, it is expected that other texts which also exhibits high quality content will result in a probability characteristic vector C having a similar set of probability characteristics with respect to the probability characteristic vector C of the reference text 2000. Generally speaking, having a method that allows the extraction of the probability characteristic vector C from a text of arbitrary length, patterns that occur in the probability characteristic vector C of well-written texts can be identified. Once patterns are identified, the deviation from such patterns can be computed so as to score the quality of any other text, by comparison.

The inventors manually analyzed several probability characteristic vectors C extracted from various reference texts 2000, for instance different parts of Wikipedia, or books, or Common Crawl, or any other corpus that consists of human-written high quality text. It was observed that certain elements of the probability characteristic vector C exhibit only small variations from one high quality reference text to another high quality reference text. For example, the first element of the probability characteristic vector C, which relates to unlikely groups, that is, groups G for which the group probability P is small, is often 0, or a low value, for high quality texts.

A principal component analysis can therefore be performed on several probability characteristic vectors C for a plurality of high quality reference texts 2000 so as to obtain a transformation matrix M. The principal component analysis being a known data analysis method, the details thereof will not be discussed here. In general, the transformation matrix M can transform the characteristic vector C to a transformed vector C1 in such a way that, when the transformed vector C1 is multiplied with the transpose of the transformation matrix M, it is possible to obtain a reconstructed characteristic vector C2 with a low deviation from the original characteristic vector C. Preferably the transformation matrix M is computed so that the difference between C and C2 is as small as possible. In other words, the transformation matrix M is created based on a plurality of characteristic vectors C deriving from higher quality text, so as to globally reduce the distances between the characteristic vectors C and the respective reconstructed characteristic vectors C2.

When the transformation matrix M is thereafter applied to characteristic vectors C of higher quality texts the distance between the reconstructed characteristic vector C2 and the original characteristic vector C is also small. On the other hand, if the matrix M is thereafter applied to characteristic vectors C of lower quality texts the distance between the reconstructed characteristic vector C2 and the original characteristic vector C is larger than in the case of higher quality texts.

In more formal terms, the transformation matrix M is defined by means of a principal component analysis working on a plurality of characteristic vectors C derived from higher quality texts, such as different parts or Wikipedia, or books, or Common Crawl, or any other corpus that consists of human-written high quality text. By applying the transformation matrix M to the characteristic vector C, a transformed vector C1 can be obtained as $$C1=M*C \quad \text{(Eq. 15)}$$

When applying the inverse operation on the transformed vector C1, a reconstructed characteristic vectors C2 is obtained $$C2 = M^T * C1 \quad \text{(Eq. 16)}$$

Based on the characteristic vector C and the reconstructed characteristic vector C2, it is possible to obtain a reconstruction error, defined as $$\text{reconstruction error} = \|C - C2\| \quad \text{(Eq. 17)}$$

The reconstruction error could already be used as quality score.

In some embodiments, since the reconstruction error is not bounded, it is advantageously possible to normalize it by the empirical maximum error which was found on the training set for the generation of the transformation matrix M, $$\text{normalized reconstruction error} = (\text{reconstruction error})/(\text{reconstruction error\_(empirical max)}) \quad \text{(Eq. 18)}$$

In this case, the quality score can then be defined as:

$$\text{quality score} = A * (1.0 - \text{normalized reconstruction error})^A \quad \text{(Eq. 19)}$$

where the parameter A is preferably comprised between 1 and 2.

Thanks to this approach it is therefore advantageously possible to score the quality of any given text with respect to known high-quality reference texts by first computing probability characteristics of at least one high-quality reference text, constructing a transformation matrix which allows to recognize similar probability characteristics, computing probability characteristics of a text to be scored and applying the transformation matrix thereto in order to obtain a quality score.

Exemplary Embodiment

In order to clarify the general concept of the embodiments described above with reference to FIGS. 1 and 2, one specific example will be discussed in the following to allow a quick grasp on how the invention could operate on some exemplary text. It will however be clear that the invention is not limited to the specifically chosen examples. For the purpose of clarifying as many steps described above as possible, the following example will implement as many steps as possible. It will however be clear, as described above, that not all steps are to be considered necessary for implementing the invention.

The example is based on two texts relating to a new mobile phone, one text which is generally considered to be a high quality text and operates as a reference text and one text which is generally considered to be a lower quality text. The lower quality text will be analyzed first.

The lower quality text reads
SellerCompany Try Prime
Cell Phones & Accessories
Departments EN Hello. Sign inAccount & ListsOrdersTry PrimeCart0
Your SeHerCompany.comToday's DealsGift Cards & RegistrySellHelpClick to call our Disability Customer Support line, or reach us directly at 1-888-283-1678
Cell Phones & AccessoriesCarrier Phones Unlocked PhonesPrime Exclusive PhonesAccessoriesCasesWearable TechnologyBest SellersDealsTrade-InAll Electronics
Cell Phones & Accessories>newPhone 6, 6S, 6 Plus & 6S Plus & FREE Shipping on eligible orders. Details
Sold by: Vius
New (9) from $345.88 & FREE shipping. Details
Have one to sell?
Sell on SellerCompany
PhoneCorp newPhone 6 64 GB Unlocked Smartphone—Gold (Certified Refurbished)
PhoneCorp
PhoneCorp newPhone 6 64 GB Unlocked Smartphone—Gold (Certified Refurbished)
3.4 out of 5 stars 1,208 customer reviews|893 answered questions
Price: $345.88 & FREE Shipping. Details
In stock on Apr. 11, 2017.
Order it now.
Sold by DealFisher and Fulfilled by SellerCompany. Gift-wrap available.
Size: 64 GB
Space Gray
This Certified Refurbished product has been tested and certified to work and look like new, with minimal to no signs of wear, by a specialized third-party seller approved by SellerCompany. The product is backed by a minimum 90-day warranty, and may arrive in a generic brown or white box. Accessories may be generic and not directly from the manufacturer.
Factory unlocked newPhones are GSM models and are ONLY compatible with GSM carriers like AT&T and T-Mobile as well as other GSM networks around the world. They WILL NOT WORK with CDMA carriers like Sprint, Verizon and the likes. The phone requires a nano SIM card (not included in the package).
Compare with similar items For the human reader, it is obvious that this is mostly just a collection of words that have little coherent structure or meaning. There might be some sections that make sense, but overall this is not a text that would be recognized as being a high-quality human written text. A simple word-matching algorithm that looks for the appearance of certain terms is easy to fool and might determine that this text provides a nicely readable text related to newPhones. However, the method of the invention can score this text accurately by recognizing it as a low quality text, as will be shown in this example.

To the contrary, the following text would be considered a higher quality text by a human reader:
The newPhone 7 and 7 Plus are deeply unusual devices. They are full of aggressive breaks from convention while wrapped in cases that look almost exactly like their two direct predecessors. Even that continuity of design is a break from convention; after almost a decade of PhoneCorp's steady two-year newPhone update pattern, merely retaining the same design for a third straight year plays against expectations.
Inside that case, everything else about the newPhone 7 is a decisive statement about the future. The dual cameras on the newPhone 7 Plus promise to usher in a new era in mobile photography. The iconic newPhone home button is no longer a physical button, but instead a sophisticated ballet of pressure sensors and haptic vibration motors that simulate the feel of a button. The new A10 Fusion processor blends two high-power cores that rival laptop performance with two low-power cores that combine with a much larger battery to extend run time by up to two hours.
And, yes, PhoneCorp has removed the headphone jack.
EVERYTHING ELSE ABOUT THE NEWPHONE 7 IS A DECISIVE STATEMENT ABOUT THE FUTURE Removing the headphone jack is an act of pure confidence from PhoneCorp, which is the only company in tech that can set off a sea changes in the industry by aggressively dropping various technologies from its products. Floppy drives, optical drives, its own proprietary 30-pin iPod connector, flash, even USB—PhoneCorp decides that it's time to move on, and it has a massive installed base of customers that love and trust the company who make it happen. And now it's decided that—yikes—the headphone jack is over.

After using the newPhone 7 and 7 Plus for about a week, it's clear to me that PhoneCorp has forceful, but considered opinions about how the next generation of phones should fit into our lives. But it's also clear that the newPhone 7 is a transitional step to that vision of the future, not a complete expression of it. The question for would-be upgraders is simple: is all of the latent promise in this phone worth the inconvenience of that transition?

This text is a well-written captivating text that provides entertainment and information to a user. The method 1000 can score this text well and thereby help in recognizing higher quality text from lower quality text.

In the following it will be show how the method 1000 performs on these two texts, step by step. It will be understood that all previously steps of method 1000 are illustrated for better understanding thereof, even though some of those steps may not be necessary for performing the method 1000.

In some embodiments, the lower quality text can first be preprocessed by preprocessing step resulting in:

SellerCompany Try Prime. Cell Phones Accessories. Departments EN Hello. Sign inAccount ListsOrdersTry PrimeCart0. Your SeHerCompany.comToday s Deals-Gift Cards RegistrySellHelpClick to call our Disability Customer Support line, or reach us directly at 1 888 283 1678. Cell Phones AccessoriesCarrier PhonesUnlocked PhonesPrime Exclusive PhonesAccessoriesCasesWearable TechnologyBest SellersDealsTrade InAll Electronics. Cell Phones Accessories newPhone 6, 6S, 6 Plus 6S Plus. FREE Shipping on eligible orders. Details. Sold by Vius. New 9 from 345.88 FREE shipping. Details. Have one to sell. Sell on SellerCompany. PhoneCorp newPhone 6 64 GB Unlocked Smartphone Gold Certified Refurbished. PhoneCorp. PhoneCorp newPhone 6 64 GB Unlocked Smartphone Gold Certified Refurbished. 3.4 out of 5 stars 1,208 customer reviews 893 answered questions. Price 345.88 FREE Shipping. Details. In stock on Apr. 11, 2017. Order it now. Sold by DealFisher and Fulfilled by SellerCompany. Gift wrap available. Size 64 GB. Space Gray. This Certified Refurbished product has been tested and certified to work and look like new, with minimal to no signs of wear, by a specialized third party seller approved by SellerCompany. The product is backed by a minimum 90 day warranty, and may arrive in a generic brown or white box. Accessories may be generic and not directly from the manufacturer. Factory unlocked newPhones are GSM models and are ONLY compatible with GSM carriers like AT T and T Mobile as well as other GSM networks around the world. They WILL NOT WORK with CDMA carriers like Sprint, Verizon and the likes. The phone requires a nano SIM card not included in the package. Compare with similar items The preprocessing step can further divide the text T into a plurality of sentences S, each comprising s list of words W. With reference to the lower quality text, according to Eq. 1 and Eq. 2, this may results into:

$$S_1 = [\langle sbegin \rangle, SellerCompany, try, prime, \langle send \rangle]$$

$$S_2 = [\langle sbegin \rangle, cell, phones, accessories, \langle send \rangle]$$

$$S\_3 = [\langle sbegin \rangle, departments, en, hello, \langle send \rangle]$$

$$\ldots$$

$$S_i = [\langle sbegin \rangle, compare, with, similar, items, \langle send \rangle]$$

Here the length of the sentences can already be computed, which will be used later in the method 1000. In the above example, the lengths of the sentences is 5, 5, 5, ..., 6. This information can be saved together with the respective sentences, as will be discussed below. For each sentence, the groups having, as an example, a size of 2 can be constructed. For instance for sentence $S_1$, according to Eq. 3 to Eq. 5:

$$G\_i_2 = [((\langle sbegin \rangle, SellerCompany), (SellerCompany, try), (try, prime), (prime, \langle send \rangle)]$$

In this manner it is possible to define the text as a nested list of group-length pairs of sentences. According to Eq. 6, for the sentences, and to Eq. 7, for the entire text:

$$T = \{[((\langle sbegin \rangle, SellerCompany), 5), ((SellerCompany, try), 5), ((try, prime), 5), ((prime, \langle send \rangle), 5)],$$
$$[((\langle sbegin \rangle, cell), 5), ((cell, phones), 5), ((phones, accessories), 5), ((accessories, \langle send \rangle), 5)], [\ldots$$
$$], ((\langle sbegin \rangle, compare), 6), ((compare, with), 6), \ldots$$
$$\ldots, ((items, \langle send \rangle), 6)]\}$$

where it can be noticed how, for the first sentence the length is indicated as being 5, while for the last sentence it is indicated to be as 6, in accordance with the exemplary text above.

As described above, for each single group $G_A$, $G_B$, $G_C$, it is possible to provide a list of integers which indicate the length of the sentence, or sentences, including the respective group. An example for groups ($\langle sbegin \rangle$, SellerCompany), which only appears once in the text above, in a sentence having a length of 5, and (cell, phones), which appears three times in the text above, in sentences having a length of 5, 13 and 12 respectively, is $$(\langle sbegin \rangle, SellerCompany):[5]$$

$$(cell, phones):[5, 13, 12]$$

In the example above, the sum of the lengths of the sentence where the respective group is coming from can be considered as a group weight. In this case the group weight GW would be, for two exemplary groups G:

$$(\langle sbegin \rangle, SellerCompany):[5]$$

$$(cell, phones)[30]$$

Alternatively, it would be possible to compute the number of sentences in which the group appears, such that if the group ($\langle sbegin \rangle$, SellerCompany) appears once in the text above, and (cell, phones) appears three times in the text above, one would obtain $$(\langle sbegin \rangle, SellerCompany):[1]$$

$$(cell, phones):[3]$$

Still alternatively, when using, as an example, the specific length smoother function F defined in Eq. 9 with the parameters base=10, exp=2 and diff=1,10, thereby adding the smoothened lengths F(Li) for each group, the group weights would be computed by evaluating the lengths of all the sentences where the group occurs and then sum it. For the group G (cell, phones) where the lengths are 5, 12 and 13 the calculation for the group weight GW would be as follows:

$$GW = (\log_{10} \min(5-1,10))^2 + (\log_{10} \min(13-1,10))^2 + (\log_{10} \min(12-1,10))^2 = (\log_{10} 4)^2 + (\log_{10} 10)^2 + (\log_{10} 10)^2 = 2.3624$$

By using this computation mode for all groups, the text T can then be represented as a list of unique groups and their associated group weights.

$$T = [(\langle sbegin \rangle, SellerCompany), 0.3624), ((SellerCompany, try), 0.3624), ((try, prime), 0.3624), ((prime, \langle send \rangle), 0.3624), ((\langle sbegin \rangle, cell), 2.3624), ((cell, phones), 2.3624), ((phones, accessories), 1.3624), \ldots, ((items, \langle send \rangle), 0.4885)]$$

Based on equations 10 and 11 it is also possible to retrieve the group probabilities P from a large enough corpus, as described above, and add the group probabilities P to each group G, thereby representing the text T as $$T = [((\langle sbegin \rangle, SellerCompany), 0.3624, 1.60*10^{-5}), ((SellerCompany, try), 0.3624, 0), ((try, prime), 0.3624, 0), ((prime, \langle send \rangle), 0.3624, 2.93*10^{-5}), ((\langle sbegin \rangle, cell), 2.3624, 2.21*10^{-5}), ((cell, phones), 2.3624, 2.47*10^{-5}), ((phones, accessories), 1.3624, 1.09*10^{-7}), \ldots, ((items, \langle send \rangle), 0.4885, 1.10*10^{-4})]$$

Some of the probabilities have a value equal to 0 since the probability of founding the given group in the text is computed based on the large corpus which may, however, not contain some specific groups G. In this case, groups such as (try, prime) do not appear in the large corpus used for the computation of the group probabilities P and therefore have a probability equal to 0.

The triples comprising the unique groups G and the respective group weight WG and probabilities P are then distributed in the interval lists, based on the probability values P, as defined by Eq. 12 and Eq. 13.

The groups weights corresponding to the same intervals are grouped and combined, for example added, together, so as to result in a single interval group weight IGW associate to the interval. The interval list is defined, as an example, in accordance with Eq. 12 and 13:

$$\text{interval list 2} := [0, 10^{-9}), [10^{-9}, 3.16*10^{-9}), [3.16*10^{-9}, 10^{-8}), [10^{-8}, 3.16*10^{-8}), [3.16*10^{-8}, 10^{-7}), [10^{-7}, 3.16*10^{-7}), [3.16*10^{-7}, 10^{-6}), [10^{-6}, 3.16*10^{-6}), [3.16*10^{-6}, 10^{-5}), [10^{-5}, 3.16*10^{-5}), [3.16*10^{-5}, 10^{-4}), [10^{-4}, 3.16*10^{-4}), [3.16*10^{-4}, 10^{-3}), [10^{-3}, 3.16*10^{-3}), [0.00316, 0.01), [0.01, 0.316), [0.316, 1]$$

Summing the groups weights WG of groups falling in the same interval it is possible to obtain, according to Eq. 14, a characteristic vector C which captures the characteristics of group occurrence of the text T. It will be clear that the group weights WG within a given interval can also be combined in manners different from a simple addition. For instance, in some embodiments, IWG would be the average of the various group weights WG. For the lower quality text above this results in:

$$C = [33.699, 0.000, 0.000, 2.362, 10.362, 10.818, 12.968, 24.475, 21.369, 27.340, 31.718, 23.077, 9.851, 6.143, 11.428, 4.000, 1.714, 3.000, 0.000]^T$$

The further optional normalizing of C based on the $L_1$ value results in:

$$C\_norm = [0.144, 0.000, 0.000, 0.010, 0.044, 0.046, 0.055, 0.104, 0.091, 0.117, 0.135, 0.098, 0.042, 0.026, 0.049, 0.017, 0.007, 0.013, 0.000]^T$$

Figure 3:
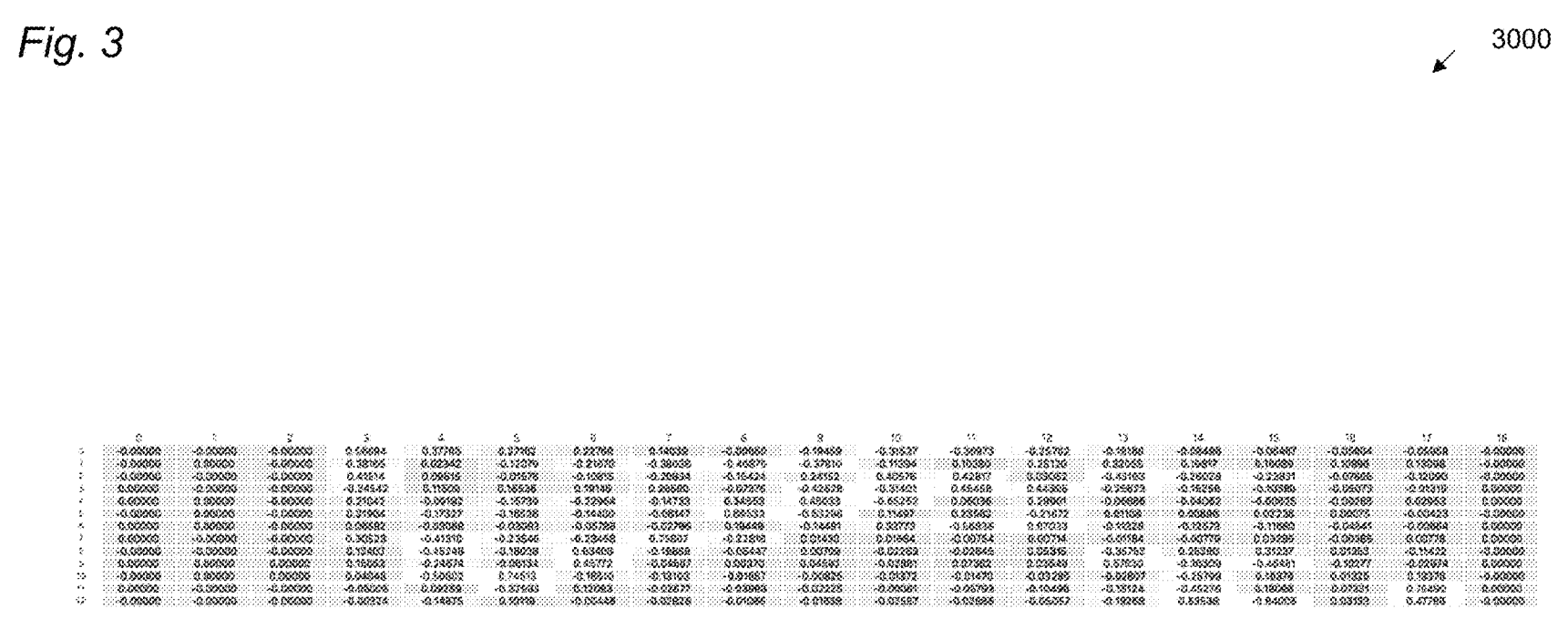

The transformation matrix M is preferably computed based on a plurality of characteristic vectors C, or C_norm. In this case, the transformation matrix M is computed once based on one or more reference texts 2000 and subsequently used for the texts to be scored. An exemplary transformation matrix M is illustrated in FIG. 3.

Multiplying the characteristic vector C of the text to be scored with the transformation matrix M, in accordance with Eq. 15, it is possible to obtain the transformed vector C1:

$$C1 = [-0.008, -0.053, 0.007, -0.014, -0.031, -0.002, -0.017, 0.016, -0.003, -0.026, -0.009, -0.002, 0.019]^T$$

As described by Eq. 16 by multiplying the transformed vector C1 with the transposes $M^T$ of the transformation matrix M, a reconstructed characteristic vector C2 is obtained:

$$C2 = [0.000, 0.000, 0.000, 0.020, 0.054, 0.056, 0.065, 0.114, 0.101, 0.126, 0.145, 0.108, 0.052, 0.036, 0.059, 0.027, 0.013, 0.023, 0.000]$$

The reconstruction error, that is, the distance between the characteristic vector C and the reconstructed vector 2 is, in this case, equal to 0.148. This could already be intended as the quality score.

When further applying the Eq. 18 and Eq. 19, with a value of the parameter A equal to 1.3 and the reconstruction error in the training set being equal to 0.15 for the English language a normalized quality score is found to be equal to 0.4023, in the present example.

In the following, some passages will illustrate how the method can be applied to the exemplary higher quality text reported above.

When representing the higher quality text T as a list of groups G, group weights WG and probabilities P, the following is obtained $$T = [(\text{next generation}, 1.0, 0.00010474888757226492), (\text{the future}, 3.0, 0.0008436964172646226), (\text{the headphone}, 2.91057876682106, 1.217*10^{-6}), \ldots]$$

The characteristic vector C resulting therefrom is $$C = [17.911, 0.000, 0.000, 14.000, 12.000, 10.000, 17.000, 31.911, 37.642, 55.000, 53.911, 33.911, 29.000, 25.911, 17.000, 13.000, 1.000, 8.000, 0.000]$$

by $L_1$ normalizing it the following is obtained:

$$[0.047, 0.000, 0.000, 0.037, 0.032, 0.027, 0.045, 0.085, 0.100, 0.146, 0.143, 0.090, 0.077, 0.069, 0.045, 0.034, 0.003, 0.021, 0.000]$$

With the same process described above, the transformed vector C1 is computed as:

$$C1 = [-0.031, -0.023, 0.007, -0.049, 0.003, -0.006, 0.009, 0.020, -0.003, -0.002, -0.009, 0.001, -0.000]$$

and the reconstructed characteristic vector C2 corresponds to:

$$C2 = [0.000, 0.000, 0.000, 0.040, 0.034, 0.029, 0.048, 0.088, 0.103, 0.149, 0.146, 0.093, 0.080, 0.071, 0.047, 0.036, 0.015, 0.023, 0.000]$$

In which case the reconstruction error is 0.05 and, following application of Eq. 18 and Eq. 19 the quality score is computed at 0.924. As can be seen, the higher value indicates a higher quality of the text under consideration.

Although in the examples above several specific features have been disclosed as pertaining to the invention, as well as specific drawings, it will be clear that the invention is not to be construed as having to incorporate all of the features described. In particular any combination of features described above can result in an embodiment of the invention.

Figure 4:
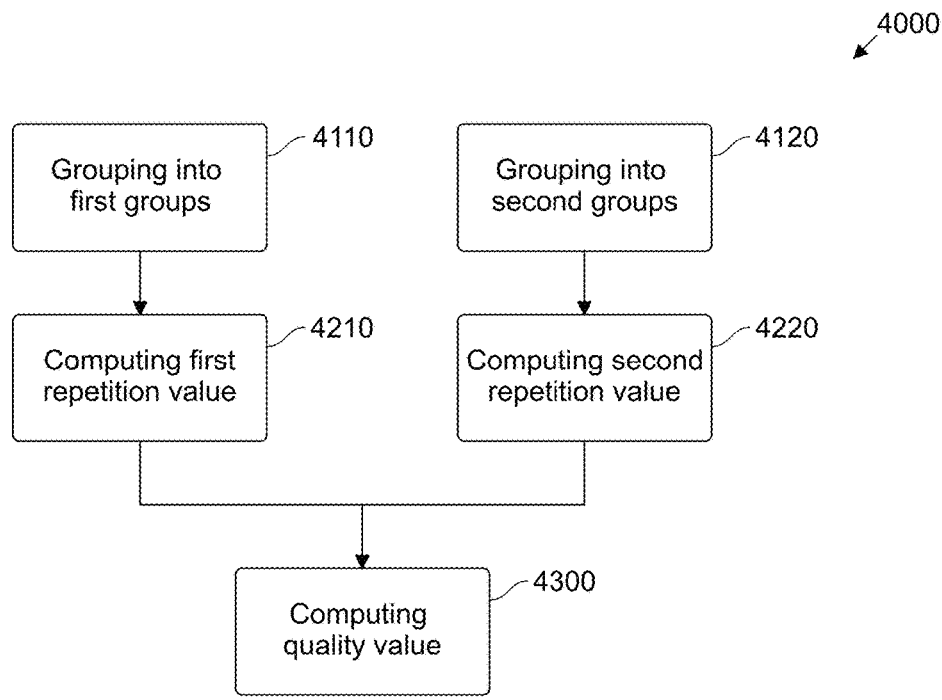
FIG. 4 schematically illustrates a method 4000 for evaluating a quality value of a text according to an embodiment of the invention.

FIG. 4 schematically illustrates a method 4000 for evaluating a quality value of a text according to an embodiment of the invention. The method will be better understood in conjunction with FIG. 5 which schematically illustrates data structures used by the method 4000 in an exemplary embodiment.

The embodiment illustrated in FIG. 4 relates to a method 4000 for evaluating a quality value of a text. The text used for explanation of the embodiment comprises a plurality of words 5001-5005, which is equal to five in the illustrated embodiment. This is for ease of illustration only and it will be clear that the invention can be applied to a text having any number of words.

Figure 5:
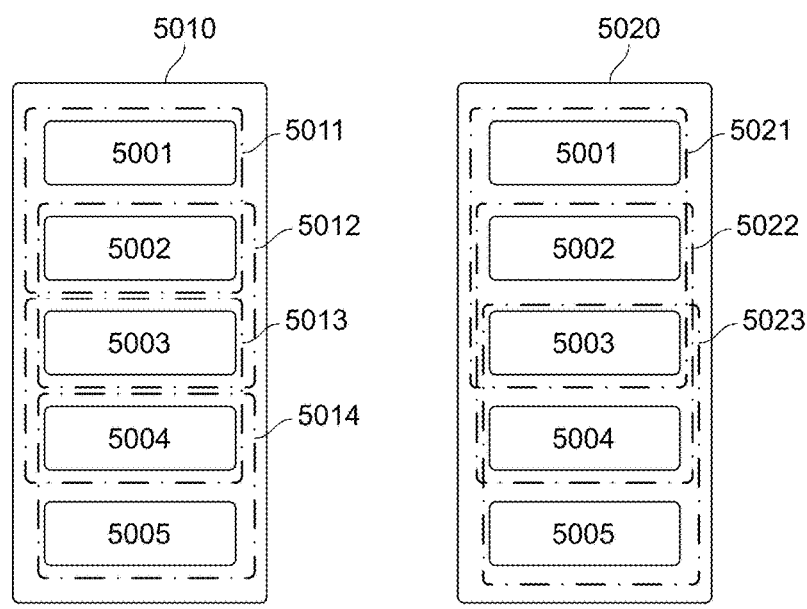
FIG. 5 schematically illustrates a plurality of arrays 5010, 5020 of groups 5011-5014, 5021-5023 of words 5001-5005 according to an embodiment of the invention.

The method 4000 comprises one or more steps of grouping 4110, 4120 the plurality of words 5001-5005 into a plurality of arrays 5010, 5020 of groups 5011-5014, 5021-5023 of words 5001-5005. In particular, as can be seen in FIG. 5, the words 5001-5005 are grouped in four groups 5011-5014 and in three groups 5021-5023. The groups 5011-5014 implement a first array 5010 while the groups 5021-5023 implement a second array 5020.

It will be clear that the number of groups and array is not limited to the specifically illustrated example but is provided for the purpose of illustration only.

In particular, the grouping step 4110, 4120 can be performed by grouping a predetermined number of words from the text, in the order in which those words are present in the text. For instance, a text can be defined as an ordered list of words, wherein a "word" within the meaning of the present invention is to be understood as a group of characters that are not split by whitespace. Thus a text T can be formally represented as $$T=[W\_1, W\_2, W\_i, \ldots, W\_n] \quad \text{(Eq. 1)}$$

where T represents the text and W_i denotes the i_th word in the text.

From the text T, the grouping step 4110, 4120 builds groups 5011-5014, 5021-5023 comprising a predetermined number of words. In particular, the predetermined number of words in a given group is the same for all groups 5011-5014, 5021-5023 of a given array 5010, 5020. With respect to FIG. 5 it can be seen how all groups 5011-5014 or array 5010 comprise two words while all groups 5021-5023 or array 5020 comprise three words. Moreover, as can be seen in FIG. 5, the predetermined number of words is different for different arrays 5010, 5020.

It should be noted that the predetermined number of words can be any number larger than one. While in the illustrated embodiment a predetermined number of words equal to two in array 5010 and equal to three in array 5020 has been used, for ease of representation, it will be clear that any predetermined number of words may have been used for array 5010, for instance 5, and any predetermined number of words may have been used for array 5020, for instance 10. Also, while the illustrated embodiment only illustrates two arrays 5010, 5020, the invention is not limited thereto any number of arrays higher than one can be used.

In general it will be appreciated that by increasing the number of predetermined number of words for a given array, the indication of repeated text becomes more effective, the reason being that groups of two words are by nature not very diverse. For example, for a simple hypothetical language that contains only 100 words, there would be 100*100=10.000 possible combinations for groups of two words, while the potential combinations for groups of three words would be 100*100*100=1.000.000. This means the probability that a group of two words is repeated is statistically higher than the probability that a group of three words repeats. This implies, for instance, that an accidental repetition can be seen more often when analyzing groups of two words than when analyzing groups of, for instance, nine words. It is therefore advantageous to increase the predetermined number of words per group in order to have a more precise indication of more quality-penalizing repetitions.

On the other hand by only selecting a high predetermined number of words per group, such as 10, there is a risk that substantial quality-reducing repetitions are ignored. For instance a 7 words repetition may already be an indication that the content is not well written. Thus, while the highest number of predetermined words in a group gives an indication of the worst kind of repetitions, the granularity in using different predetermined number of words for different arrays gives the possibility to also provide a quality score for content which does not have repetitions as bad as the highest number, but still has substantial repetitions.

All groups 5011-5014, 5021-5023 comprise a predetermined number of words. In one preferred embodiment, the number of predetermined words in each group can be defined by a list S defined as $$S=[2, \ldots, n] \quad \text{(Eq. 2)}$$

In some embodiments of the invention the number of predetermined words S can be comprised between a minimum value and 20, preferably between a minimum value and 15, even more preferably between a minimum value and 10, as studies carried out by the inventors have shown that those values are particularly advantageous in order to identify low-quality text. The minimum value can advantageously correspond to 5, preferably 4, more preferably 3 and even more preferably 2.

In some embodiments of the invention the number of predetermined words between groups can have a difference of one word among neighboring groups, such as S=[2, 3, 4, 5, 6, 7, 8, 9, 10] or two words among neighboring groups, such as S=[2, 4, 6, 8, 10], or more than two words among neighboring groups, not necessarily at a constant distance from each other, such as S=[2, 5, 7, 10]. Studies carried out by the inventors have shown that the quality detection when using groups which differ from each other by two words provide a quality indication with only slightly less granularity than groups which differ from each other by one word, however significantly reduce the computational resources needed.

For each group size of the list S, an array 5010, 5020 can be constructed with the grouping step 4110, 4120. For instance, assuming S=[2, 3, . . . , 10] the resulting arrays A_2 to A_10 would be the result of the grouping step 5010, 5020:

$$A\_2 = [(W\_1, W\_2), (W\_2, W\_3), \ldots, (W\_(n-1), W\_n)] \quad \text{(Eq. 3.1)}$$

$$A\_3 = [(W\_1, W\_2, W\_3), (W\_2, W\_3, W\_4), \\ \ldots, (W\_(n-2), W\_(n-1), W\_n)] \quad \text{(Eq. 3.2)}$$

...

$$A\_10 = [(W\_1, \ldots, W\_10), \quad (W\_2, \ldots, W\_11), \ldots, (W\_(n-9), \ldots, W\_n)] \quad \text{(Eq. 3.3)}$$

Where A_k represents the array 5010, 5020 of groups 5011-5014, 5021-5023 made of k words and (W_1, ..., W_k) denotes a group 5011-5014, 5021-5023 composed of k words.

The method 4000 further comprises a step 4210, 4220 of computing a repetition value for each array 5010, 5020 based on a number of repeated groups within each array 5010, 5020. In general the purpose of step is to provide a numerical value indicating the amount of repetition within the original text.

It will be clear to the skilled person that this can be carried out in several ways. For instance, in each array, group may be compared against all other groups and every time a correspondence is identified a counter may be incremented by one. In this manner, a higher count would indicate a higher degree of repetition. In general, any calculation which allows providing a numerical value indicative of the amount of group repetition within the plurality of arrays can be used in order to implement the computing step 4210, 4220.

In the following, one specific implementation for the computing step 4210, 4220 will be described with reference to FIG. 6. It will be however understood that the present invention is not limited to the specific implementation. In particular, in the embodiment illustrated in FIG. 6, the number of times each unique group 5011-5014 and 5021-5023 is repeated within the respective array 5010 and 5020 is counted in a counting step 6211. This can be expressed as a list C:

$$C = [(G\_1, n\_1), (G\_2, n\_2), \ldots, (G\_j, n\_j)] \quad \text{(Eq. 4)}$$

where G_j denotes the j_th unique group in the list C, that is, for a given array for which the list C is computed, and n_j denotes the number of times this group was repeated in the respective array A, while k is the number of unique groups for the given array A. It will be understood that the number k of unique groups G in a given array A is equal to, or smaller than, the length of the array A, since one or more groups G may be repeating in the array A.

Moreover, for each array 5010, 5020, that is, for each list C it is possible to compute a repeated content ratio R in a computing step 6212 as follows:

$$R = [\Sigma_{n\_j > 1}(n\_j)] / [\Sigma_j(n\_j)] \quad \text{(Eq. 5)}$$

In particular this advantageously provides an indication of the repetition factor R which is independent of the size of the array. This advantageously allows the method of the invention to provide an objective indication of the quality score of the text independently on the size of the text under consideration. Moreover this ensures that the value of the repetition factor R is always comprised between 0 and 1 which advantageously allows a reliable, straightforward and repeatable comparison of different quality scores from different texts of different sizes and/or based on different set of predetermined values S for the words in each group.

The method 4000 further comprises a step 4300 of computing the quality value based on the repetition values. In some embodiments, the step of computing the quality value 4300 can be implemented by outputting of the repetition factor R for each array 5010, 5020. Alternatively, or in addition, in some embodiments the step of computing the quality value 4300 can be implemented by outputting an average of the repetition factors R of all arrays 5010, 5020.

In the following, one specific implementation for the computing step 4300 will be described with reference to FIG. 7. It will be however understood that the present invention is not limited to the specific implementation. Moreover it will be clear that the steps 7301-7303 illustrated in the embodiment of FIG. 7 are not all essential to the invention and that they can be implemented independently of each other, on a single basis, as each one is related to different advantages which may be desirably implemented alone from each other when implementing the invention in different embodiments.

Figure 7:
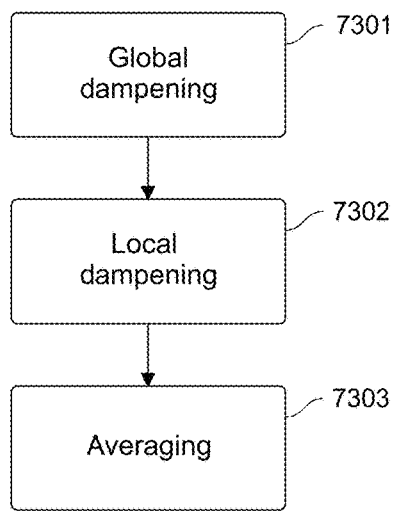
FIG. 7 schematically illustrates an implementation for the computing step 4300 according to an embodiment of the invention.

In particular, the implementation of the computing step 4300 according to the specific embodiment of FIG. 7 comprises global dampening step 7301 and/or a local dampening step 7302 and/or an averaging step 7303.

The global dampening step 7301 is configured to reduce the repeated content ratio R for smaller values of repeated content ratio more than for higher values of repeated content ratio. In some embodiments the reduction is preferably having a non-linear characteristic.

In other words, the reduction percentage increases for smaller values of repeated content ratio more than for higher values of repeated content ratio. As an example to clarify this point, if a repeated content ratio has a value of 0.3 and, by means of the global dampening step 7301, it gets reduced to 0.2, then the reduction percentage is equal to 0.1/0.3=33.3% while the absolute reduction is 0.1. When applying the same absolute reduction to a repeated content ratio having a value of 0.6, the reduction percentage is equal to 0.1/0.6=16.6%. That is, in percentage terms, the smaller value 0.3 of repeated content ratio is reduced more than the higher value 0.6 of repeated content ratio. Thus, in some embodiments, the dampening step 7301 can be configured to reduce, in percentage terms, the repeated content ratio R for smaller values of repeated content ratio more than for higher values of repeated content ratio.

The global dampening step 7301 can be implemented in any way which allows such reduction. In other words, any kind of reduction can be implemented at global dampening step 7301 which results in a bigger shrinkage percentage for the smaller values of the repeated content ratio R than for the larger values of the repeated content ratio R, that is, any reduction for which the percentage reduction as a function of the repeated content ratio R is a monotonically decreasing function.

As another example, based on the repeated content ratio R computed as described above, the global dampening step 7301 can be configured to dampen repetition factors R in such a way that the lower repetition factors R, namely those closer to 0, get dampened more in comparison to those with higher values. This can be achieved in any manner which allows reducing values closer to 0 more than values further away from 0. For instance by using an exponentiation operation. It will be clear, however that any operation F can be used which provides similar characteristics. The advantage of the global dampening step 7301 consists in helping to distinguish heavily repeated text from slightly repeated text. When using the exponentiation as global dampening step, the dampened repeated content ratio Rd can be expressed as:

$$Rd = R^{\text{insensitivity}} \quad \text{(Eq. 6)}$$

where the parameter "insensitivity" can be selected by the user to any value higher than 1. This allows for more flexibility as the user can tweak this parameter as needed until the results of the method 4000 indicate a quality value which substantially corresponds to the expectation of the user. In some embodiments, the parameter "insensitivity" can be selected to a value comprised between 1 and 5, preferably between 1 and 3, even more preferably between 1.5 and 2.5.

The local dampening step 7302 is configured to dampen the repetition values to compensate for the fact that the repeated content ratio and/or the dampened repeated content ratio tend to be higher for smaller groups and lower for longer groups, as repetition in longer groups imply repetitions in shorter groups but not vice versa.

In particular, the local dampening step 7302 works locally for the repeated content ratio R, or the dampened repeated content ratio Rd, calculated for each array A, in contrast to the global dampening step 7301 which is global and operates in the same manner for each group size S. For instance a factor depending on the predetermined number of words per group could be applied to the repetition count in the group. As an example, the repetition count could be divided by the predetermined number of words.

The local dampening step 7302 is configured to reduce the repeated content ratio for arrays having a smaller predetermined number of words more than for arrays having a larger predetermined number of words. This is based on the consideration that, given an array with groups of X words and an array with groups of Y words, where Y is larger than X, if a group is repeated in the array with Y words it is also repeated in the array with X words, but not the other way around. In other words, smaller groups tend to repeat more often than larger groups.

As a possible exemplary implementation, based on the repeated content ratio R computed as described above, the local dampening step 7302 can computed a locally dampened repeated content ratio Rstd, for each value of k, as $$Rstd\_k = Rd\_k \cdot ((\min(k)/k)^{EXP}) \quad \text{(Eq. 7)}$$

where k is the predetermined number of words per group, Rd_k is the dampened repeated content ratio for the given value of k and min(k) is the minimum value of k used by the method 4000. It will be clear that this embodiment can also be implemented by using the repeated content ratio R_k instead of the dampened repeated content ratio Rd_k.

This allows the local dampening 7302 to advantageously operate locally, differently form the global dampening step 7301. That is, the local dampening step 7302 behaves differently from groups of, for example, 2 words than for groups of, for example, 5 words.

The parameter "EXP", which is chosen to be higher than 0, allows the skewed effect of locally dampening over different values of k to be controlled. That it, the difference in behavior of the local dampening step 7302 among groups having different predetermined values of words can be controlled by the EXP parameter.

In particular, as the EXP value is increased, the difference in the operation of the local dampening step 7302 among groups having different predetermined values of words is reduced. The EXP value advantageously allows a user to fine tune the operation of the method 4000 to preferred behavior.

In some embodiments the value of the EXP parameter can be set to any value comprised between 0 and 20, preferably between 0 and 10.

Such an approach is particularly advantageous as it locally dampen the values of the repeated content ratio R, or of the dampened repeated content ratio Rd, based on the smallest value of k used, namely based on the size of the smallest word group.

The averaging step 7303 is configured to average the repetition values, or values computed based on the repetition values such as the repeated content ratio, the dampened repeated content ratio and/or the locally dampened repeated content ratio, in order to provide a single output as indicative of the quality value. Formally, with reference to the above embodiments, the average can be computed as $$\text{average} = (\Sigma_k Rstd\_k)/(\text{count}(k)) \quad \text{(Eq. 8)}$$

where the count(k) indicates the number of different values of k used in the method 4000, for instance the size of the list S indicated in Eq. 2 above. It will be understood that the above expression can also be implemented by replacing the locally dampened repeated content ratio Rstd with the dampened repeated content ratio Rd, with the repeated content ratio R or with any value providing an indication of the number of repetition in each array 5010, 5020.

In some embodiments a preprocessing step may be carried out on the text prior to the grouping step 4110, 4120. The purpose of the preprocessing step is to generally clean the text from elements which are not relevant for the evaluation of the quality of the text as well as reducing the computational resources needed to perform method 4000.

In some embodiments of the preprocessing step any of the following may be removed from the text:
stopwords such as "a, about, above, after, again, against, all, am, an, and, any, are, aren't, as, at, be, because, been, before, being, below, between, both, but, by, can't, cannot, could, couldn't, did, didn't, do, does, doesn't, doing, don't, down, during, each, few, for, from, further, had, hadn't, has, hasn't, have, haven't, having, he, he'd, he'll, he's, her, here, here's, hers, herself, him, himself, his, how, how's, I, I'd, I'll . . . etc." as listed, for instance, at http://www.ranks.nl/stopwords, the content of which is herewith incorporated by reference.
words with has less than 2 characters
characters that are not alphanumeric, such as %, &, + and §
punctuation signs such as , . and ;
Moreover, in some embodiments of the preprocessing step, any of the following transformations may be carried out:
converting all characters into their lowercase form,
converting all accented characters into their unaccented form.

Exemplary Embodiment

In order to clarify the general concept of the embodiments described above with reference to FIGS. 4 to 7, two specific examples will be discussed in the following to allow a quick grasp on how the invention could operate. It will however be clear that the invention is not limited to the specifically chosen examples. For the purpose of clarifying as many steps described above as possible, the following example will implement as many steps as possible. It will however be clear, as described above, that not all steps are to be considered necessary for implementing the invention.

The examples are based on two texts relating to a new mobile phone, one text which is generally considered to be a high quality text and one text which is generally considered to be a lower quality text. The higher quality text will be analyzed first.

The higher quality text reads "The newphone 7 and 7 Plus are deeply unusual devices. They are full of aggressive breaks from convention while wrapped in cases that look almost exactly like their two direct predecessors. Even that continuity of design is a break from convention; after almost a decade of PhoneCorp's steady two-year newphone update pattern, merely retaining the same design for a third straight year plays against expectations. Inside that case, everything else about the newphone 7 is a decisive statement about the future. The dual cameras on the newphone 7 Plus promise to usher in a new era in mobile photography. The iconic newphone home button is no longer a physical button, but instead a sophisticated ballet of pressure sensors and haptic vibration motors that simulate the feel of a button. The new A10 Fusion processor blends two high-power cores that rival laptop performance with two low-power cores that combine with a much larger battery to extend run time by up to two hours."

Before the grouping step 4110, 4120, in this example, the text is processed by means the optional preprocessing step described above. After the preprocessing step the text looks like as "the newphone plus deeply unusual devices. they full aggressive breaks convention wrapped cases look almost exactly like two direct predecessors. even continuity design break convention almost decade PhoneCorp s steady two-year newphone update pattern merely retaining design third straight year plays expectations. inside case everything else newphone decisive statement future. the dual cameras newphone plus promise usher new era mobile photography. the iconic newphone home button longer physical button instead sophisticated ballet pressure sensors haptic vibration motors simulate feel button. the new a 10 fusion processor blends two high-power cores rival laptop performance two low-power cores combine much larger battery extend run time two hours."

In this example the grouping step 4110, 4120 is carried out for groups having predetermined sizes S=[2, 3, . . . , 10], thereby generating 9 arrays 5010, 5020. The arrays A_2 to A_10 resulting therefrom look like as follows:

A_2 =

[(the, newphone), (newphone, plus), (plus, deeply), (deeply, unusual), (unusual, devices.), ... (run, time), (time, two), (two, hours.)]

A_3 = [(the, newphone, plus), (newphone, plus, deeply), (plus, deeply, unusual), (deeply, unusual, devices.), ... (run, time, two), (time, two, hours.)]

...

A_10 = [(the, newphone, plus, deeply, unusual, devices., they, full, aggressive, breaks), (newphone, plus, deeply, unusual, devices., they, full, aggressive, breaks, convention), ... (cores, combine, much, larger, battery, extend, run, time, two, hours.)]

Next, in the computing step 4210, 4220 the number of occurrences of the groups which populate the arrays is counted, resulting in the lists C_2 to C_9. In this specific example the computing step 4210, 4220 is implemented in accordance with the specific embodiment of FIG. 6, as previously described it will be however clear that the invention is not limited to this implementation.

C_2 = [((the, newphone), 1), ((newphone, plus), 2), ((plus, deeply), 1), ((deeply, unusual), 1), ... ((two, hours.)1)]

C_3 = [((the, newphone, plus), 1), ((newphone, plus, deeply), 1), ((plus, deeply, unusual), 1), ... ((time, two, hours.), 1)]

...

C_10 = [((the, newphone, plus, deeply, unusual, devices., they, full, aggressive, breaks), 1), ... ((cores, combine, much, larger, battery, extend, run, time, two, hours.), 1)]

Next, the computing step 6212 is carried out based on the above lists C, so as to compute the repeated content ratio R for each array 5010, 5020. This results in the following:

$R\_2 = (0+1+0+0+ , , , )/(1+2+1+1+ \ldots ) = 2/102$ $R\_3 = (0+0+0+0+ , , , )/(1+1+1+1+ \ldots ) = 0/101 = 0$ $R\_4 = (0+0+0+0+ , , , )/(1+1+1+1+ \ldots ) = 0/100 = 0$ $R\_5 = (0+0+0+0+ , , , )/(1+1+1+1+ \ldots ) = 0/99 = 0$ $R\_6 = (0+0+0+0+ , , , )/(1+1+1+1+ \ldots ) = 0/98 = 0$ $R\_7 = (0+0+0+0+ , , , )/(1+1+1+1+ \ldots ) = 0/97 = 0$ $R\_8 = (0+0+0+0+ , , , )/(1+1+1+1+ \ldots ) = 0/96 = 0$ $R\_9 = (0+0+0+0+ , , , )/(1+1+1+1+ \ldots ) = 0/95 = 0$ $R\_10 = (0+0+0+0+ , , , )/(1+1+1+1+ \ldots ) = 0/94 = 0$ Here the quality value could be computed in any manner based on the repetition values, or the repeated content ratios R. For instance it may be possible to sum the various R_2 . . . R10, resulting in a global quality value. For the purpose of clarifying the operation of the global dampening step 7301, an example will be provided by using it. In this case, with the insensitivity parameter set to an exemplary value of 2, it obtains $Rd\_2 = R\_2^2 = (2/102)^{2.0} \cong 0.000384$

...

$Rd\_10 = R\_10^{2.0} = 0^{2} = 0$

Here the quality value could be computed in any manner based on the dampened repeated content ratios Rd. For instance it may be possible to sum the various Rd_2 . . . Rd10, resulting in a global quality value. For the purpose of clarifying the operation of the local dampening step 7302, an example will be provided by using it. In this case, with the EXP parameter set to an exemplary value of 1, it obtains $Rstd\_2 = Rd\_2^{((2/2)^1)} = 0.000384$

...

$Rstd\_10 = Rd\_10^{((2/10)^1)} = 0$

Here the quality value could be computed in any manner based on the locally dampened repeated content ratios Rstd. For instance it may be possible to sum the various Rstd_2 ... Rd10, resulting in a global quality value. For the purpose of clarifying the operation of the averaging step 7303, an example will be provided by using it. In this case the average value corresponds to:

$$\text{average} = 0.000384/9 = 4.27 \times 10^{-5}$$

In the following, the same exemplary as above will be carried out for a lower quality text. The lower quality text reads: "The newPhone 7 and 7 Plus are deeply unusual devices. They are full of aggressive breaks from convention while wrapped in cases that look almost exactly like their two direct predecessors. They are full of aggressive breaks from convention while wrapped in cases that look almost exactly like their two direct predecessors. Even that continuity of design is a break from convention; after almost a decade of PhoneCorp's steady two-year newPhone update pattern, merely retaining the same design for a third straight year plays against expectations. Inside that case, everything else about the newPhone 7 is a decisive statement about the future. The dual cameras on the newPhone 7 Plus promise to usher in a new era in mobile photography. The dual cameras on the newPhone 7 Plus promise to usher in a new era in mobile photography. The iconic newPhone home button is no longer a physical button, but instead a sophisticated ballet of pressure sensors and haptic vibration motors that simulate the feel of a button. The new A10 Fusion processor blends two high-power cores that rival laptop performance with two low-power cores that combine with a much larger battery to extend run time by up to two hours.".

As can be seen, the quality of this text is lower than in the previous example as the sentence is repeated twice. This results in the reader to lose attention and generally consider the content to be of lower quality. This, in turns, reduces the likelihood that the user may decide to keep using the website providing the content, or buy an object on the website.

As in the above example, a preprocessing step is performed resulting in: "the newphone plus deeply unusual devices. they full aggressive breaks convention wrapped cases look almost exactly like two direct predecessors. they full aggressive breaks convention wrapped cases look almost exactly like two direct predecessors. even continuity design break convention almost decade PhoneCorp s steady two-year newphone update pattern merely retaining design third straight year plays expectations. inside case everything else newphone decisive statement future. the dual cameras newphone plus promise usher new era mobile photography. the dual cameras newphone plus promise usher new era mobile photography. the iconic newphone home button longer physical button instead sophisticated ballet pressure sensors haptic vibration motors simulate feel button. the new a 10 fusion processor blends two high-power cores rival laptop performance two low-power cores combine much larger battery extend run time two hours.".

When carrying out the same steps as for the higher quality text, the following is obtained for the grouping step 4110, 4120:

A_2 = [(the, newphone), (newphone, plus), (plus, deeply), (deeply, unusual), (unusual, devices.), ... (run, time), (time, two), (two, hours.)]

A_3 = [(the, newphone, plus), (newphone, plus, deeply), (plus, deeply, unusual), (deeply, unusual, devices.), ... (run, time, two), (time, two, hours.)]

A_10 = [(the, newphone, plus, deeply, unusual, devices., they, full, aggressive, breaks), In the computing step 4210, 4220 the number of occurrences is computed as C_2 = [((the, newphone), 1), ((newphone, plus), 3), ((plus, deeply), 1), ((deeply, unusual), 1), ... ((two, hours.), 1)]

C_3 = [((the, newphone, plus), 1), ((newphone, plus, deeply), 1), ((plus, deeply, unusual), 1), ... ((time, two, hours.), 1)]

...

C_10 = [((the, newphone, plus, deeply, unusual, devices., they, full, aggressive, breaks), 1), ... ((cores, combine, much, larger, battery, extend, run, time, two, hours.), 1)]

The output of the computing step 6212 therefore consists in $R\_2 = (0+3+0+0+ \ldots)/(1+3+1+1+ \ldots) = 49/127$ $R\_3 = (0+0+0+0+ \ldots)/(1+1+1+1+ \ldots) = 44/126$ $R\_4 = (0+0+0+0+ \ldots)/(1+1+1+1+ \ldots) = 40/125$ $R\_5 = (0+0+0+0+ \ldots)/(1+1+1+1+ \ldots) = 36/124$ $R\_6 = (0+0+0+0+ \ldots)/(1+1+1+1+ \ldots) = 32/123$ $R\_7 = (0+0+0+0+ \ldots)/(1+1+1+1+ \ldots) = 28/122$ $R\_8 = (0+0+0+0+ \ldots)/(1+1+1+1+ \ldots) = 24/121$ $R\_9 = (0+0+0+0+ \ldots)/(1+1+1+1+ \ldots) = 20/121$ $R\_10 = (0+0+0+0+ \ldots)/(1+1+1+1+ \ldots) = 16/121$ The output of the global dampening step 7301, with the same value of the insensitivity parameter as above, therefore consists in $Rd\_2 \cong 0.1488, Rd\_3 \cong 0.1219, Rd\_4 \cong 0.1024,$
$Rd\_5 \cong 0.0842, Rd\_6 \cong 0.0676, Rd\_7 \cong 0.0526,$
$Rd\_8 \cong 0.0393, Rd\_9 \cong 0.0277, Rd\_10 \cong 0.0180$ The output of the local dampening step 7302, with the same value of the EXP parameter as above, therefore consists in $Rstd\_2 \cong 0.1488, Rstd\_3 \cong 0.2459, Rstd\_4 \cong 0.32,$
$Rstd\_5 \cong 0.3717, Rstd\_6 \cong 0.4075, Rstd\_7 \cong 0.4312,$
$Rstd\_8 \cong 0.4453, Rstd\_9 \cong 0.4509, Rstd\_10 \cong 0.4481$ And finally the output of the averaging step 7303 consists in $$\text{average} = 3.2698/9 = 0.3633$$

which is substantially higher than the previously computed value of $4.27 \times 10^{-5}$ for the higher quality text, thus indicating a the presence of a lower quality text.

Although in the examples above several specific features have been disclosed as pertaining to the invention, as well as specific drawings, it will be clear that the invention is not to be construed as having to incorporate all of the features described. In particular any combination of features described above can result in an embodiment of the invention.

LIST OF REFERENCE NUMERALS

Figure 6:
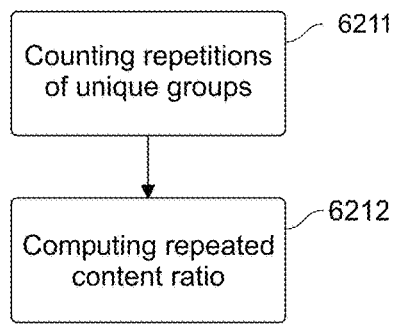
FIG. 6 schematically illustrates an implementation for the computing step 4210, 4220 according to an embodiment of the invention.

FIG. 1
1100: first probability characteristics computing step
1200: second probability characteristics computing step
1300: quality score computing step
FIG. 2
2000: reference text
2001-2005: word
2011-2014: group
FIG. 3
3000: transformation matrix
FIG. 4
4000: method for evaluating a quality value of a text
4110, 4120: grouping step
4210, 4220: computing step
4300: computing step
FIG. 5
5001-5005: word
5010: array
5011-5014: group
5020: array
5021-5023: group
FIG. 6
6211: counting step
6212: computing step
FIG. 7
7301: global dampening step
7302: Local dampening step
7303: Averaging step

The invention claimed is:

1. A method (1000) for evaluating a quality score of a text, the text comprising a plurality of words (2001-2005), the method comprising the steps of:
computing first probability characteristics (1100) of groups of words in a reference text (2000) including a high-quality text,
computing second probability characteristics (1200) of groups of words in a text to be scored,
computing the quality score (1300) based on a difference between the first probability characteristics and the second probability characteristics,
wherein the step of computing the first probability characteristics (1100) or the step of computing the second probability characteristics (1200) comprises identifying unique groups of words and computing a group weight for each unique group of words, and
wherein the group weight is defined as $$GW_j = \Sigma_{i(\text{for all } Si \text{ comprising } Gj)} F(L_i)$$

where:
$GW_j$ is the group weight for the j-th group,
$G_j$ is the j-th group,
$L_i$ is a length of a sentence,
$S_i$ is one of the sentences from the reference text (2000), and
the function F is a monotonically increasing function.

2. The method (1000) according to claim 1, wherein the groups of words have a length comprised between 2 and 6.

3. The method (1000) according to claim 1, wherein the group weight is based on a number of times the unique group appears in the reference text or the text to be scored.

4. The method (1000) according to claim 1, wherein the group weight is based on the length of sentences in which the unique group appears in the reference text or the text to be scored.

5. The method (1000) according to claim 1, wherein the step of computing the first probability characteristics (1100) or the step of computing the second probability characteristics (1200) comprises associating to each unique group the respective group weight and a probability of the unique group to appear in a large text corpus.

6. The method (1000) according to claim 5, wherein the large text corpus has a size larger than 1 million sentences.

7. The method (1000) according to claim 5, wherein the step of computing the first probability characteristics (1100) or the step of computing the second probability characteristics (1200) comprises grouping the unique groups in a plurality of probability intervals based on the probability associated to the unique groups, and combining the group weights within each probability interval.

8. A method (1000) for evaluating a quality score of a text, the text comprising a plurality of words (2001-2005), the method comprising the steps of:
computing first probability characteristics (1100) of groups of words in a reference text (2000) including a high-quality text,
computing second probability characteristics (1200) of groups of words in a text to be scored,
computing the quality score (1300) based on a difference between the first probability characteristics and the second probability characteristics,
wherein the step of computing the first probability characteristics (1100) or the step of computing the second probability characteristics (1200) comprises identifying unique groups of words and computing a group weight for each unique group of words,
wherein the step of computing the first probability characteristics (1100) or the step of computing the second probability characteristics (1200) comprises associating to each unique group the respective group weight and a probability of the unique group to appear in a large text corpus,
wherein the step of computing the first probability characteristics (1100) or the step of computing the second probability characteristics (1200) comprises grouping the unique groups in a plurality of probability intervals based on the probability associated to the unique groups, and combining the group weights within each probability interval, and
wherein a number of the probability intervals is comprised between 3 and 50.

9. A method (1000) for evaluating a quality score of a text, the text comprising a plurality of words (2001-2005), the method comprising the steps of:
computing first probability characteristics (1100) of groups of words in a reference text (2000) including a high-quality text,
computing second probability characteristics (1200) of groups of words in a text to be scored,
computing the quality score (1300) based on a difference between the first probability characteristics and the second probability characteristics,
wherein the step of computing the quality score comprises creating a transformation matrix based on the first probability characteristics, wherein the transformation matrix is a matrix which, when applied to transform the first probability characteristics into transformed first probability characteristics and to transform the transformed first probability characteristics into reconstructed first probability characteristics, is configured to minimize a difference between the first probability characteristics and the reconstructed first probability characteristics.

10. The method (1000) according to claim 9, wherein the step of computing the quality score (1300) comprises
applying the transformation matrix to the second probability characteristics to transform the second probability characteristics into transformed second probability characteristics and to transform the transformed second probability characteristics into reconstructed second probability characteristics, and
computing the quality score based on a difference between the second probability characteristics and the reconstructed second probability characteristics.

11. A method (4000) for evaluating a quality value of a text, the text comprising a plurality of words (5001-5005), the method comprising the steps of:
grouping (4110, 4120) the plurality of words (5001-5005) into a plurality of arrays (5010, 5020) of groups (5011-5014, 5021-5023) of words (5001-5005), wherein all groups (5011-5014, 5021-5023) comprise a predetermined number of words,
wherein the predetermined number of words is the same for all groups (5011-5014, 5021-5023) of a given array (5010, 5020), and wherein the predetermined number of words is different for different arrays (5010, 5020),
computing a repetition value (4210, 4220) for each array (5010, 5020) based on a number of repeated groups within each array (5010, 5020),
computing the quality value (4300) based on the repetition values,
wherein the step of computing the repetition value (4210, 4220) comprises the steps of:
counting (6211) a number of times each unique group (5011-5014, 5021-5023) is repeated within a single array (5010, 5020), and
computing (6212) a repeated content ratio according to the equation $$R\_k = [\Sigma_{n\_j > 1}(n\_j)] / [\Sigma_j (n\_j)]$$

wherein:
n_j denotes the number of times a j-th unique group (5011-5014, 5021-5023) is repeated in the single array (5010, 5020), and
k is the predetermined number of words.

12. The method according to claim 11, wherein the predetermined number of words is comprised between 2 and 20.

13. The method according to claim 11, wherein the step of computing the quality value (4300) comprises a global dampening step (7301) configured to reduce the repeated content ratio for smaller values of repeated content ratio more than for higher values of repeated content ratio.

14. The method according to claim 13, wherein the global dampening step (7301) comprises the operation:

$$Rd\_k = R\_k^{\text{insensitivity}}$$

wherein:
Rd_k is a dampened repeated content ratio for a given value of k,
insensitivity has a value which can be selected to any value higher than 1.

15. The method according to claim 14, wherein insensitivity has a value comprised between 1 and 5.

16. The method according to claim 11, wherein the step of computing the quality value (4300) comprises a local dampening step (7302) which is configured to reduce the repeated content ratio for arrays having a smaller predetermined number of words more than for arrays having a larger predetermined number of words.

17. The method according to claim 16, wherein the local dampening step (7302) comprises the operation:

$$R\text{std}\_k = R\_k^{((\min(k)/k)^{\text{EXP}})}$$

wherein:
min(k) is a minimum value of k used by the method (4000), and
EXP is chosen to be higher than 0.

18. The method according to claim 14, wherein the step of computing the quality value (4300) comprises a local dampening step (7302) which is configured to reduce the repeated content ratio for arrays having a smaller predetermined number of words more than for arrays having a larger predetermined number of words.

19. The method according to claim 18, wherein the local dampening step (7302) comprises the operation:

$$R\text{std}\_k = Rd\_k^{((\min(k)/k)^{\text{EXP}})}$$

wherein:
min(k) is a minimum value of k used by the method (4000), and
EXP is chosen to be higher than 0.

20. The method according to claim 11, wherein the step of computing the quality value (4300) comprises an averaging step (7303) configured to average the repetition values, or values computed based on the repetition values, to provide a single output as indicative of the quality value.

* * * * *